Aug. 14, 1934.  J. E. POINTON ET AL  1,970,336
DOUGH MOLDING MACHINE
Filed Aug. 11, 1932   3 Sheets-Sheet 1

INVENTORS
JOHN EDWARD POINTON
LAURENCE SEYMOUR HARBER
BY George B. Willcox.
ATTORNEY Aug. 14, 1934.     J. E. POINTON ET AL     1,970,336
DOUGH MOLDING MACHINE
Filed Aug. 11, 1932     3 Sheets-Sheet 2
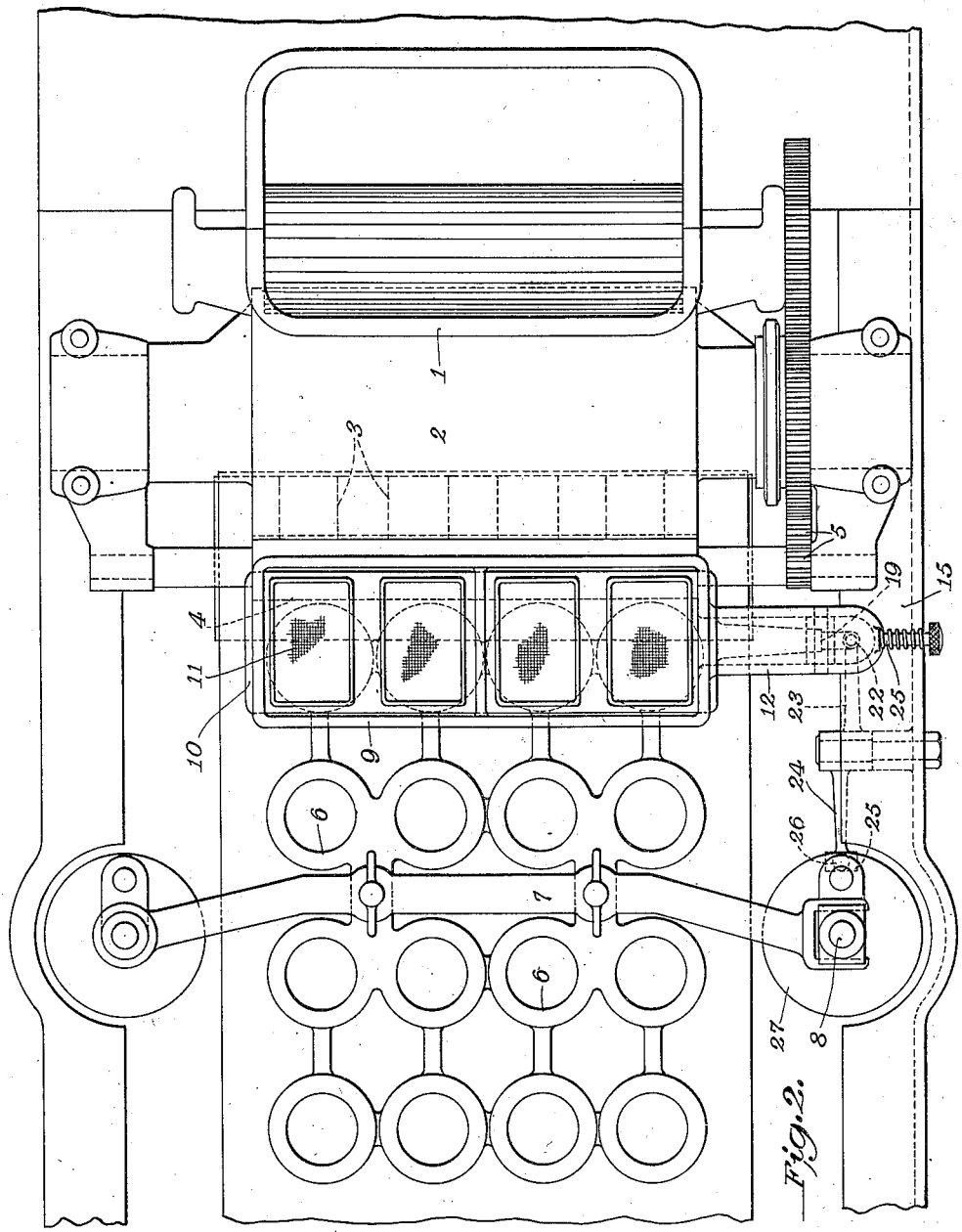
INVENTORS
JOHN EDWARD POINTON
LAURENCE SEYMOUR HARBER
BY George B. Willey
ATTORNEY

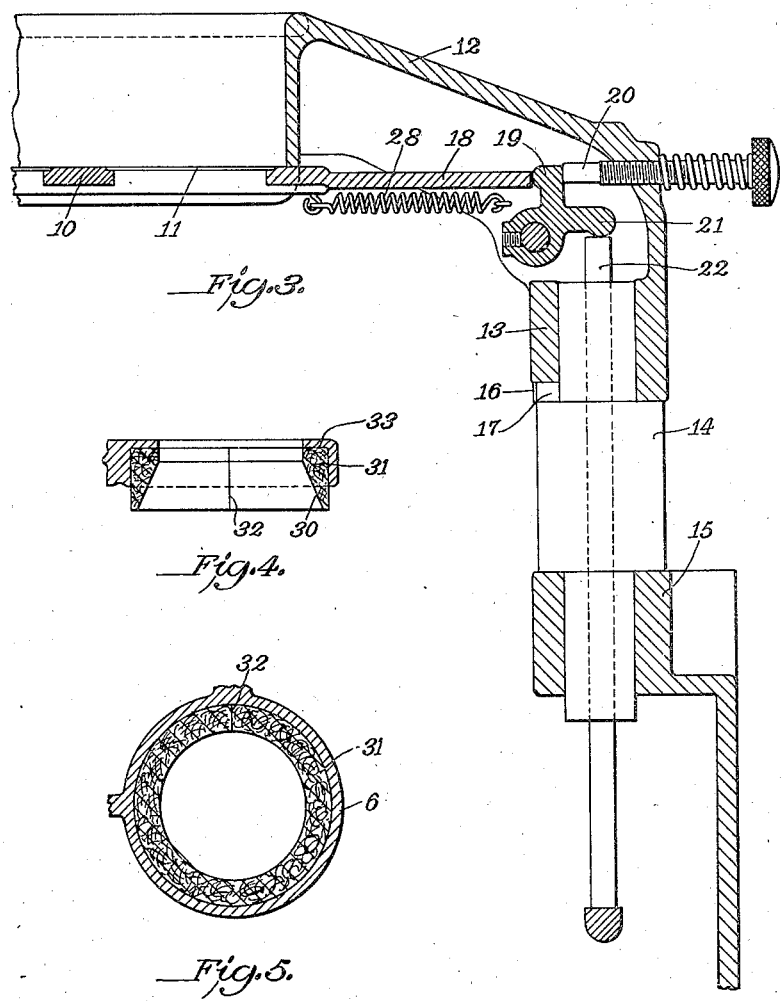

Patented Aug. 14, 1934

1,970,336

UNITED STATES PATENT OFFICE 1,970,336

DOUGH MOLDING MACHINE

John Edward Pointon and Laurence Seymour Harber, Westwood Works, Peterborough, England, assignors to Baker Perkins Company, Inc., Saginaw, Mich., a corporation of New York Application August 11, 1932, Serial No. 628,374
In Great Britain August 12, 1931

5 Claims. (Cl. 107—4)

This invention relates to methods and apparatus for molding dough or the like and has more particular reference to that type of molding which is directed to the molding of dough into balls of sphere-like formations, by the use of cups or rings which are given an orbital or balling motion about the axis of the cups or rings.

The object of the present invention is to provide a simplified method and means concerned with dough molding means of the kind indicated above and the invention is more particularly concerned with the avoidance of clogging of the dough as it is passed to the molding means and the delivery thereof into the cups in a proper state for the balling treatment.

A further aim of the invention is to afford an apparatus in which the various parts thereof are readily accessible for cleaning or adjustment.

According to the invention dough molding open cups or rings which are given a balling motion of known kind are employed.

The invention consists in creating a free shower of flour vertically over the first of the series of balling cups or rings so that there is an unobstructed fall about the latter and discharging or delivering dough pieces laterally into the shower as they fall into the first series of rings.

It is preferred to employ a dough divider of the rotary head type in which the divided dough pieces are discharged upon an associated roller which throws or passes the pieces from the cylinder outwardly and downwardly towards the cups or rings.

A flour sifting or dusting device of any known kind is arranged above and forwardly of the dough delivery roller so that the zone of the shower from the dusting device includes the first of the series of balling cups or rings. The shower may be confined to the first of the series of cups or rings or it may include wholly or partially the delivery roller so that the dough pieces are dusted both as they are transferred by the roller and as they enter the shower above the cups.

A further feature of the invention relates to the provision of the cups or rings with replaceable conical linings of felt or other suitable material in strip form so that the lining can be bent round and readily inserted within the cup and similarly easily replaced.

It is preferred to provide an improved flour dusting device of simple and effective construction. This device comprises an open bottomed trough with a flanged lower edge adapted to receive a loose screen bottom member capable of longitudinal vibratory motion. The sieving motion is preferably imparted by a tapping device with or without the aid of reactive resilient means.

In the accompanying drawings:

Figure 2 is a corresponding plan.

Figure 3 is a sectional elevation showing the agitating means.

Figures 4 and 5 are respectively sectional elevation and plan of one of the molding rings showing the improved inserted molding surface.

Figure 1:
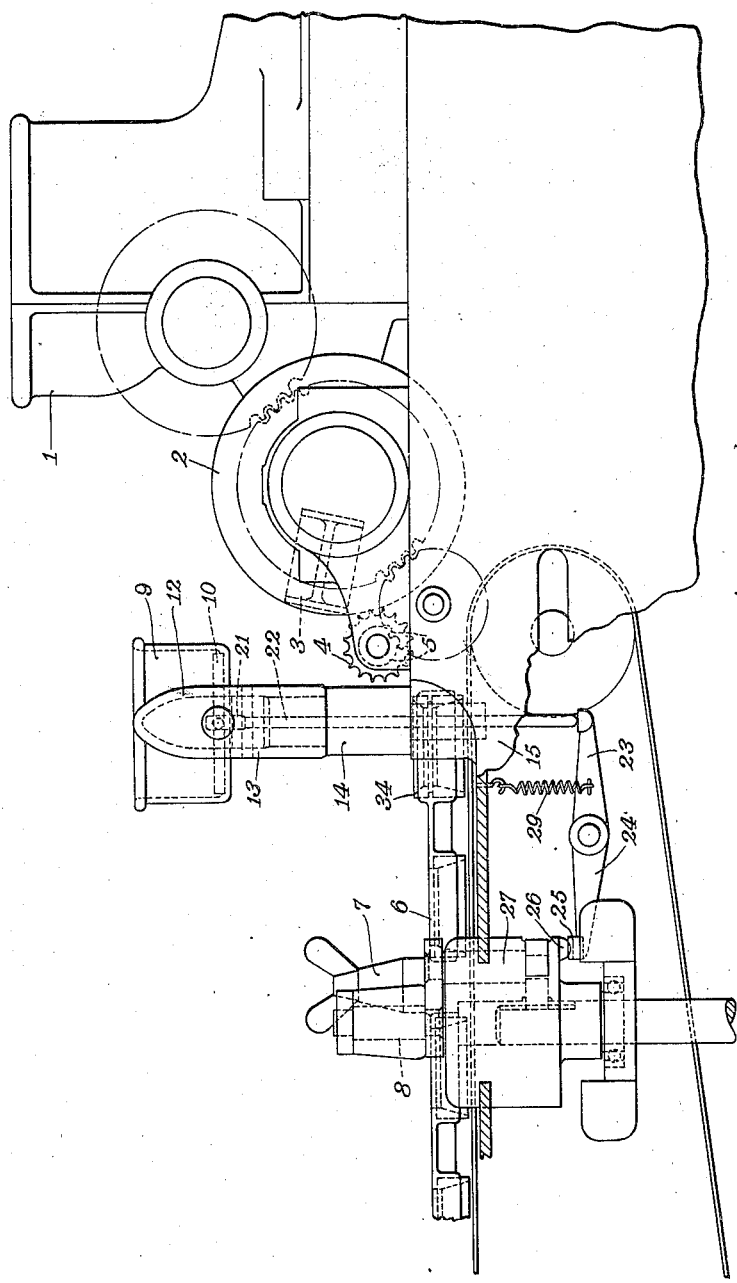
Figure 1 is a side elevation of a molding machine according to the invention and having the improved flour dusting means.

In carrying the invention into effect according to one convenient mode by way of example, a dough divider 1 is provided with a rotary head 2 and is adapted to measure off a series of dough pieces, say four, and for this purpose a longitudinal row of dividing members 3 is provided in the head.

The rotary head 2 is adapted to be rotated to carry the dough pieces upwardly and over to a delivery position in a substantially horizontal plane containing the axis of the head where the pieces are discharged by the operation of the plungers in the measuring chambers.

The dough pieces are received and transferred by a rotating roller 4 which is mounted just below the horizontal and has a surface of a nature adapted to afford the minimum of support for the dough pieces. For this purpose the roller is preferably provided with deep longitudinal flutes as described in our copending application Serial No. 572,647.

The roller 4 is rotated at a relatively high speed with regard to the peripheral speed of the rotary dividing head, for example, by spur gearing 5, whereby the dough is expeditiously removed from the head and in a clean manner.

The dough pieces are projected by the delivery or transfer roller 4 laterally and downwardly into open cups 6 by which a molding action is imparted to the dough, the cups being carried by a cross-head 7 mounted upon crank pins 8 and having a gyratory or balling motion imparted to them, for example, by means of driving mechanism as described and claimed in our co-pending application No. 628,375, wherein is disclosed the mechanism for utilizing several rows of cups.

Mounted above the row of cups into which the dough pieces are delivered is a flour dusting device which is adapted to produce a free shower of flour over the cups into which the dough pieces are projected. The flour dusting device may be of any suitable form and may comprise a box 9 extending across the machine and disposed more or less vertically above the rows of cups. The box is open at the bottom and flanged to support a loose frame 10 having sieves 11, means being provided for agitating the frame 10, as by a tapping mechanism, so that a slight relative movement between the sieve and the box is provided, whereby the flour is sifted and thrown down in a cloud or shower or a series thereof.

The flour box 9 is provided with a hollow arm 12 having a downwardly extending sleeve 13 which seats upon a support 14 carried by the frame 15 of the machine. The sleeve 13 is provided with a recess 16 adapted to engage a projection 17 on the support 14 to locate the flour box transversely across the machine.

For the purpose of agitating the flour and producing the shower the frame 10 is provided with an extension 18 adapted to engage one arm 19 of a pivoted bell crank tappet which is also adapted to abut against an adjustable stop 20 carried by the arm of the flour box. The other arm 21 of the bell crank tappet engages the upper end of a vertical rod 22 which is conveniently guided in an aperture in the support 14. The lower end of the rod 22 engages one arm 23 of a pivoted lever, the other arm 24 of which is provided with an inclined surface or ramp 25, adapted to be intermittently engaged by a member to cause the lever 23, 24 to oscillate. As shown the lever is oscillated by the engagement of the ramp by a projection 26 carried by the rotating head 27 of the molding cup mechanism.

At each revolution of the head 27 the projection 26 will actuate the lever 23, 24 raising the rod 22 and causing pivotal movement of the bell crank tappet 19, 21, resulting in a movement of the sieve frame 10 to the left as seen in Figure 3. When the projection 26 moves off the ramp 25, the parts are returned quickly by the returning spring 28 so that the arm 19 strikes the stop 20 and thus agitates the flour box and associated parts and produces a shower.

The lever arm 23 is held up to the rod 22 by a spring 29 which is of less strength than the spring 28.

If desired, and as shown, the dimensions of the flour duster may be such as to include the transfer roller 4 or a part thereof in the shower. Flour may also be supplied to the subsequent rows of molding cups as may be necessary or desired.

It will be appreciated that with the parts arranged in the above described manner all surfaces with which the dough pieces come into contact are in view of the operator and readily accessible so that if any sticking should occur, the machine may be quickly stopped and the parts cleaned as may be necessary. Moreover, the arrangement of the flour dusting device above the molding cups affords a free shower directly onto the parts concerned and enables the operator to supply just sufficient flour to the dough pieces as may be required so that there is no danger of supplying an insufficient amount, or more flour than is necessary with consequent spoiling of the dough. Thus, by adjusting the stop 20 the amplitude of the movement of the sieve frame 10 may be varied or reduced to zero.

The molding rings or cups are of known shape having a conical interior molding surface 30, and according to a feature of the invention this conical feature is provided by the provision of a removable strip of felt 31 or other suitable material having a substantially triangular or wedge shape cross section, the felt being bent into ring shape with abutting ends 32 so that it may be readily removed and replaced as desired.

The upper edges of the cups are turned inwardly to provide a surface 33 against which the edge of the felt strip will abut as shown in Figure 4.

The first row of rings may be provided with an upper guiding member 34 (see Figure 1) which may comprise a strip of felt or other suitable material of wedge shape in cross section, providing a flared mouth for the cup.

Having thus described our invention, what we claim and desire to secure by Letters Patent is:

1. In a machine for molding dough comprising open receptacles into which dough pieces are delivered, means imparting orbital balling motion to said receptacles, dusting means creating a vertical free shower of flour over the receptacles, said dusting means comprising a flour box having a relatively movable bottom sieve frame and means driven by the receptacle actuating means whereby the frame is caused to strike against an abutment member.

2. A machine as claimed in claim 1, wherein an intermittently actuated tappet member is provided to move the sieve frame away from an adjustable abutment member mounted on the box, against the action of a retractile swing.

3. A machine for molding dough comprising a series of rows of open receptacles to which an orbital balling motion is imparted, means for creating a shower of flour vertically over the first row of said receptacles so that there is an unobstructed dusting fall about the latter, a deeply fluted roller, a dough divider having a dividing head adapted to discharge divided pieces of dough directly onto said roller, means imparting sufficiently rapid rotation to the roller so that the dough pieces are thereby cleared from the dividing head and projected laterally into the shower of flour dust and downwardly into the first row of the receptacles.

4. In a machine for molding dough comprising rings, means imparting orbital balling motion to said rings, a flour dusting mechanism actuated by said ring-moving means and arranged to discharge a vertical dusting fall about the rings, a dough dividing head adjacent said rings, a deeply fluted roller onto which the dough pieces are directly delivered from the dividing head, said roller being revolved at a speed adapted to clear the dough pieces from the dividing head and to project them through the vertical dusting fall into the rings.

5. In a machine for molding dough comprising rings, means imparting orbital balling motion to said rings, dusting mechanism disposed vertically over said rings and adapted to create a shower of flour having an unobstructed fall about the rings, connections driven from said ring actuating means to said dusting mechanism for actuating the latter, and means for projetcting dough pieces laterally through said shower and downwardly into said rings.

JOHN EDWARD POINTON.
LAURENCE SEYMOUR HARBER.